United States Patent [19]

Robey et al.

[11] 4,293,237

[45] Oct. 6, 1981

[54] IRRIGATION AND DRAINAGE APPARATUS

[76] Inventors: Melvin J. Robey, 4507 Fortuna, Salt Lake City, Utah 84117; David E. Bingaman, 462 W. 3600 South, Bountiful, Utah 84010; Arthur E. Read, 24 Hockley Pl., Don Mills, Ontario, Canada, M3A2S4

[21] Appl. No.: 53,352

[22] Filed: Jun. 29, 1979

[51] Int. Cl.³ .............................................. E02B 13/00
[52] U.S. Cl. ...................................... 405/39; 405/43; 405/51
[58] Field of Search ................. 405/36, 39, 43, 44, 405/47, 48, 51; 47/1 R, 48.5

[56] References Cited

U.S. PATENT DOCUMENTS

| | | | |
|---|---|---|---|
| 253,093 | 1/1882 | Payne et al. | 405/47 |
| 640,077 | 12/1899 | Bagby | 405/47 |
| 1,576,790 | 3/1926 | Roessner | 405/44 |
| 2,536,196 | 1/1951 | Mac Leod | 405/43 |
| 3,068,616 | 12/1962 | Shibata et al. | 405/39 X |
| 3,200,539 | 8/1965 | Kelly | 405/39 X |

FOREIGN PATENT DOCUMENTS 285783  7/1915  Fed. Rep. of Germany ........ 405/43

Primary Examiner—David H. Corbin
Attorney, Agent, or Firm—M. Reid Russell

[57] ABSTRACT

The present invention constitutes an improved subsurface irrigation and drainage apparatus and system for its use that includes at least one main pipe or line arranged to receive a water flow therein that can include a water born fertilizer and, optionally, the main pipe or line can incorporate a fan or like arrangement for injecting an air-flow therein and, as required, an airborn fertilizer. The main line preferably includes spaced cross-pieces that are joined to lateral lines or laterals and may incorporate sleeves therewith, which main line, laterals, and sleeves may contain weirs for maintaining a desired water head therebehind as appropriate, and may include slots, holes or like openings formed therein above and/or below a water line therein.

The weirs arranged within the cross-pieces, laterals and sleeves preferably have a triangular shape with the base thereof connected to the lowest surface therein, the sides rising therefrom and sloping inwardly to an apex, which sloping surface facilitates flushing sediment therefrom by introduction of a rapid water flow thereagainst, and each weir can include an arrangement for passing water from a separate source from the flow through the main line, that separate flow passing into the area downstream or in front of the weir as needed, to provide an additional water source thereto. Further, to compensate for any deviation from a desired plane or grade within the drainage system, the present invention provides for inclusion of weirs of different heights wherebehind a desired level of water can be held to effectively and economically provide uniform watering.

14 Claims, 9 Drawing Figures

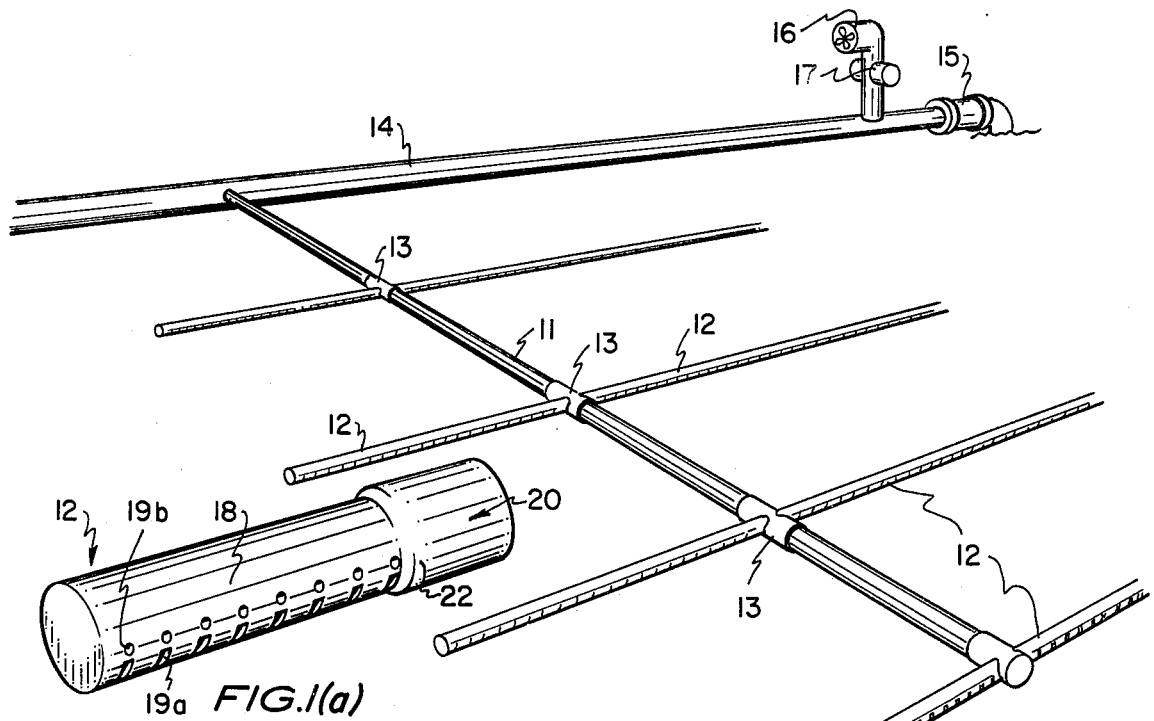
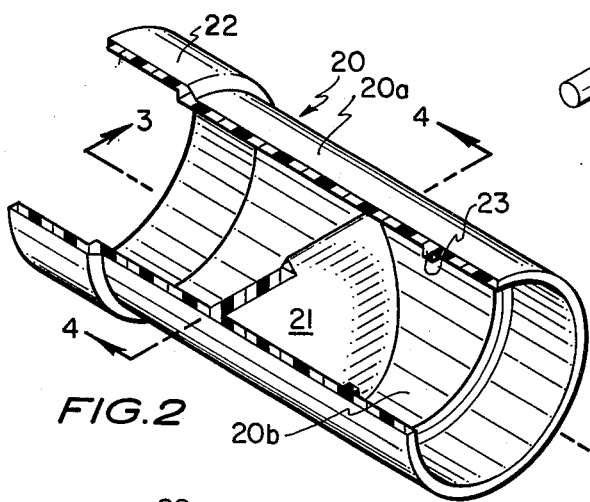
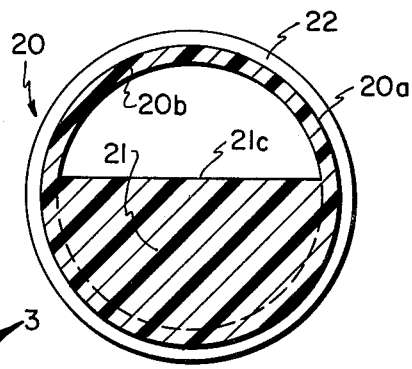
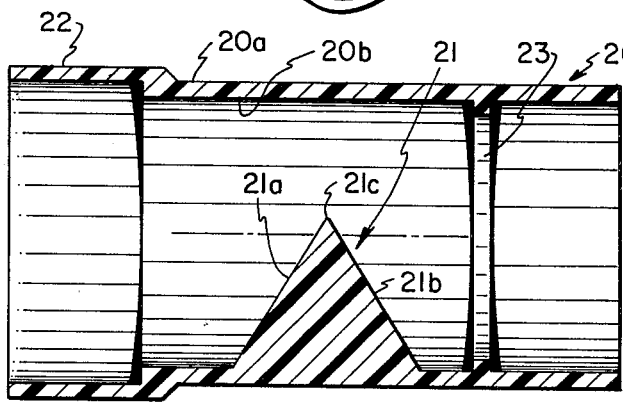

IRRIGATION AND DRAINAGE APPARATUS

DESCRIPTION OF THE INVENTION

1. Field of the Invention

This invention relates to subsurface irrigation and drainage systems for providing uniform watering of an area and may include arrangements for providing both subsurface aeration and fertilization.

2. Prior Art

Water, of course, is a most precious natural resource and, in many areas of the world, it is in short supply. Therefore, to provide for an efficient and economic utilization of this resource, it is desirable to make a full, beneficial use thereof, minimizing waste in irrigation and drainage operations. Traditionally, irrigation of any growing plants has taken place above ground, water passing over the ground through trenches, ditches, or has been sprinkled thereover. Such surface watering, results, of course, in large evaporation losses. Where an above-ground system has been relied upon to provide watering of an area, due to such inherent problems, it has often been found that the water distribution may be uneven, with evaporation losses causing certain areas to not be fully soaked where other areas that are perhaps lower in elevation, receive an excess of water. Either condition of over or under-watering, of course, limits or damages growth of plants in that area.

The present invention provides an underground irrigation and drainage system that minimizes evaporation losses and further provides a precise, controlled and uniform application of water throughout an area by strategic use of weirs arranged in both main and lateral lines wherebehind can be maintained a desired liquid level within the system. Use of weirs or gates is, of course, well known in ditch irrigation systems. An example of such an adjustable gate arrangement is shown in a device by Shelley, U.S. Pat. No. 3,410,094. However, within the knowledge of the inventors, prior to the present invention, weirs or weir arrangements have not been included within underground irrigation or drainage systems. Further, and unique to the present invention, depending upon the area wherein the present invention is installed and the need to compensate for system elevation irregularities, weirs of different heights may be used to facilitate or provide for a desired liquid level therebehind producing a uniform water distribution within a certain area during irrigation and/or drainage.

The apparatus of the present invention is preferably fabricated from component elements to include at least one main line; cross-pieces for coupling lateral lines or laterals to the main line; and, sleeves for joining pipes together for on-site assembly with certain of the sleeves and cross-pieces preferably including weirs therein. Prefabricated units for on-site assembly are, of course, not new to the field of irrigation, with such an arrangement shown in a patent by Naylor, U.S. Pat. No. 1,153,332. Neither the arrangement of the Naylor patent or any arrangement within the knowledge of the inventors, is, however, like the structure of the present invention. Further, while former devices such as a patent by Jenkins Jr., U.S. Pat. No. 2,820,479, and a more current patent by Waterston, U.S. Pat. No. 3,898,843, have each employed different arrangements for limited water flow in an irrigation system, such are above-ground installations and are structurally unlike the present invention. Further, unlike any device known to the present inventions, the sides of the preferred weir configuration are slanted appropriately to facilitate cleaning by passing a flow thereover, and the weirs are preferably included in the sleeves and cross-pieces during fabrication thereof. The present invention, by a selection of appropriate weir heights within the system, provides for system balancing to compensate for elevation irregularities to provide for uniform watering of an area, which arrangement, within the knowledge of the inventors, is new and unique.

The present invention, additional to providing for uniform watering or drainage throughout an area by the strategic placement of weirs within main and lateral lines, also provides for both aerating and fertilizing of a flow throughout the main and lateral lines. Such can be accomplished in the present invention by introducing a liquid fertilizer into the water flow through the system, and optionally, a fan pushing an air-flow into the system can be provided for aerating the ground wherein the apparatus is installed. This air-flow can, as desired, include an airborn fertilizer. While liquid fertilization systems for underground watering operations are not in themselves unique, one such system is shown in a patent by Kelly, U.S. Pat. No. 3,200,539, and a similar system thereto shown in a patent by Ryan, U.S. Pat. No. 1,173,534, these former systems lack the versatility of the present invention and further fail to include the capability of adding fertilizer to both the water and/or air-flows. Also, these arrangements do not provide for disseminating the flows uniformly throughout an area.

Within the knowledge of the present inventors, there has not heretofore existed an irrigation and drainage apparatus like that of the present invention.

SUMMARY OF THE INVENTION

It is the principal object of the present invention in an irrigation and drainage apparatus to provide a system to uniformly water a designated subsurface area.

Another object of the present invention is to provide an irrigation and drainage system for installation below ground that includes main and lateral lines connected to a water source and includes a strategic placement of weirs or gates therein that are appropriate to hold a desired level of water therebehind.

Another object of the present invention is to provide weirs or gates of selected heights for strategic placement in main and laterals of a subsurface system, as appropriate to compensate for elevation differences within the system from a desired level or slope to maintain uniform water accumulation therebehind to provide a desired seepage therefrom to uniformly distribute water within an area.

Still another object of the present invention is to provide a subsurface system of main and lateral lines that include an arrangement for providing both water to and an air-flow into a defined area which arrangement can also provide for passing fertilizer into that defined area.

Still another object of the present invention is to provide, additional to a main flow through main and lateral lines of an underground irrigation and drainage system, for passing water from an independent source through other appropriate passages entering the main and lateral lines as a supplement water supply to the system.

Still another object of the present invention is to provide an arrangement of main and lateral lines and cross-pieces and sleeves for arrangement therewith for subsurface installation as an irrigation and drainage apparatus that includes weirs or gates that are strategically installed therein, which apparatus is inexpensive to fabricate, simple to assemble and is manufactured from conventional plastic, or like materials.

Principal features of the present invention in an irrigation and drainage apparatus include at least one main flow line connected so as to receive and pass water therethrough from a water supply line that can be pumped or gravity fed. In the main line are located cross-pieces whereto are secured lateral lines, intersecting at normal angles to the main line. Water is passed through the main line and through the laterals for distribution into surrounding areas through appropriate slots, holes, or the like, formed therein. The main and lateral lines are intended for subsurface installation and sleeves are provided for joining laterals together. Further, within the cross-pieces, laterals, and sleeves, as appropriate, weirs or gates can be arranged wherebehind water will backup so as to provide a desired level or head therebehind. A preferred weir or gate configuration is one that is secured in or formed as an integral portion of the main line, sleeve or cross-piece that has a triangular shape, the base of which is secured within the main line, sleeve or cross-piece, wherefrom sides slant upwardly and inwardly to meet in an apex. So arranged, the inwardly slanting sides provide a self-cleaning feature, in that the force of a flow of water thereagainst will tend to pickup and move thereover sediment thereon.

Preferably, the main and lateral lines, cross-pieces, and sleeves are fabricated from a plastic material to facilitate their handling and coupling together into the preferred irrigation and drainage apparatus of the present invention. Further, the weirs or gates that are included appropriately in the lines, cross-pieces and sleeves are preferably formed as parts thereof in the manufacturing process and each, as required, can include an appropriate passageway formed therethrough, opening without the apparatus and on a weir slanted surface for coupling to a separate water source to pass water therethrough to provide a water head between select weirs or gates. The present invention preferably provides for injection, as by operation of a pump, fan, or the like, of an air-flow, with or without an airborn fertilizer therein, into the main and lateral lines for passage out into the soil area wherein the present invention is installed through appropriate holes, slots, or the like, formed in those lines above a filled water level. So arranged, the soil wherein the irrigation and drainage apparatus of the present invention is installed can be aerated and fertilized in addition to being watered. Also, a liquid fertilizer can be included in the water flow, as required, to fertilize also the area watered by the present invention.

The irrigation and drainage apparatus of the present invention, as it is preferably arranged below ground, must be carefully installed so as to maintain a desired level or slope within the system to provide a uniform watering. The described weirs or gates, of course, provide a water backup or head therebehind. Therefore, by providing weirs or gates of appropriate heights, during installation of the system, the system can be balanced so as to compensate for variations from a level or desired slope so as to insure a uniform water distribution. Therefore, the weirs or gates of the present invention, it should be understood, can be manufactured so as to have a desired height or elevation within a cross-piece of sleeve which units can be coded appropriately to identify the particular height of a weir or gate contained therein for inclusion into the system to provide that desired water backup or head therebehind.

Further objects and features of the present invention in an irrigation and drainage apparatus will become more apparent from the following detailed description taken together with the accompanying drawings.

THE DRAWINGS

FIG. 1, is a schematic view of the present invention in an irrigation and drainage apparatus shown laid out over an area to be irrigated prior to receiving soil filled thereover;

FIG. 1(a), a perspective view of a sleeve with a portion of a lateral pipe of FIG. 1 fitted thereto, showing the lateral pipe as having plurality of spaced-apart holes formed therein above what would be a water level with slots shown therein below that level;

FIG. 2, a perspective view of the sleeve of FIG. 1(a) showing a portion thereof removed to expose the sleeve interior showing it to include a weir or gate secured therein that extends across and partially around the lower or bottom portion of the interior thereof;

FIG. 3, a sectional view, taken along the line 3—3 of FIG. 2, showing a profile cross-section of the interior of the sleeve of FIG. 2 showing the preferred weir of gate as having a triangular shape as viewed from the side;

FIG. 4, a sectional view, taken along the line 4—4 of FIG. 2, showing an end cross-section of the sleeve and the weir or gate arranged therein;

FIG. 5, a perspective view of a sleeve with another embodiment of a weir or gate configuration arranged therein showing a portion of the sleeve and weir or gate removed to show the weir or gate to include a passage therein that opens to without the sleeve and from a weir or gate face for passing a water flow from a water source, not shown, into the sleeve interior;

FIG. 6, a sectional view, taken along the line 6—6 of FIG. 5, showing an end cross-section of the sleeve and the weir or gate arranged therein;

FIG. 7, a perspective view of a cross-piece like those shown in FIG. 1, showing sections of two of the connected intersecting legs thereof removed to expose the cross-piece interior, with one leg shown as including a weir or gate therein; and FIG. 8, a sectional view taken along the line 8—8 of FIG. 7, showing a side view of the preferred sloping weir or gate configuration of the present invention.

DETAILED DESCRIPTION

Figure 5:
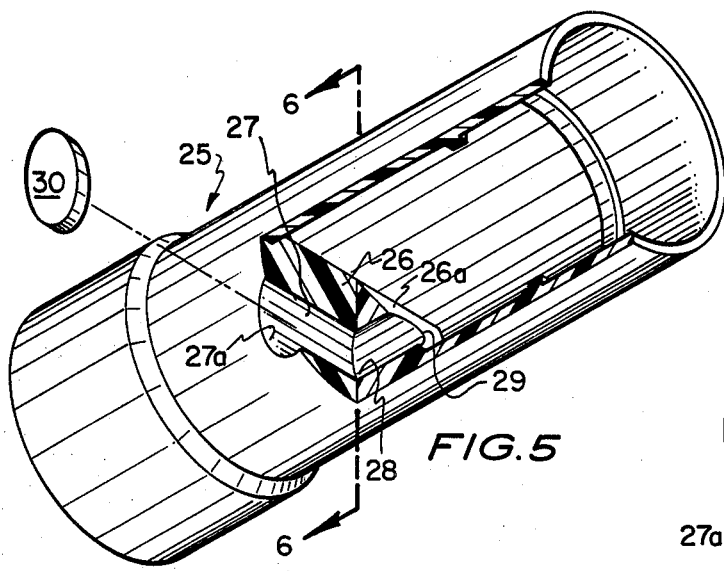

Referring now to the drawings:

Shown in FIG. 1 is an irrigation and drainage apparatus 10 of the present invention that preferably consists of a main drain line 11, hereinafter referred to as main line, whereto are connected, intersecting at normal angles, lateral drain lines 12, hereinafter referred to as lateral or laterals. A preferred connection arrangement for joining laterals 12 to main line 11 includes a cross-piece 13 that will be described in detail later herein with respect to FIG. 7 and 8. Shown in FIG. 1, a water flow is supplied to main line 11 through a supply line 14 that should be taken as functioning as a drainage system that is gravity fed, or water is passed therethrough by operation of a pump 15. Preferably, the present invention includes an air-moving arrangement, as represented by a fan 16 and a valve 17 associated therewith, to selectively pass an air-flow into the supply line 14. So arranged, a water flow into the irrigation apparatus 10 can itself be aerated or, an air-flow can be passed alone through the main line and laterals, that flow passing out through appropriate openings formed in the main and lateral lines to aerate the surrounding soil. Further, while not shown, it should be understood that an airborn fertilizer could be added to the above-described air-flow, and that the liquid flow could also receive and have mixed therewith a fertilizer, as required.

Shown in FIG. 1(a) is a preferred arrangement of a lateral 12 that consists of a straight piece of tubular stock 18 that, as shown in FIG. 2, is preferably formed from a plastic material. Of course, other shapes of pipe could be so used that are formed from materials other than plastic and still be within the scope of this disclosure. Tubular stock 18, as shown in FIG. 1(a), preferably includes a number of perforations formed therein both above and below a water line or head of water that will be held therein, as will be explained in detail later herein. Shown in FIG. 1(a) are two arrangements of perforations that consist of slots 19a, formed around the bottom half of the tube, and holes 19b, formed thereabove in the top half of the tube. Slots 19a and holes 19b are examples of perforations only and should not be taken as restricting the present disclosure.

So arranged, a liquid in a lateral 12 will tend to seep out through slots 19a into the surrounding soil and an air-flow passing therethrough will pass out through holes 19b into that same surrounding soil aerating that soil. Further, as described hereinabove, if an airborn fertilizer is employed, it would also pass out also through holes 19b into the surrounding soil. Shown in FIG. 1, slots or holes can be included in both the laterals 12 and in main lines 11, depending on the needs of the system and the ground wherein the irrigation apparatus of the present invention is installed.

As has been mentioned hereinabove, the present invention in an irrigation apparatus 10 is preferably installed so as to provide a required head of water to supply water to an area under irrigation. To insure that that water supply completely and equally waters the area wherein the present invention is installed, weirs or gates, hereinafter referred to as weirs, or the like, are fixed appropriately in the main line or laterals to maintain the desired head or level of water therebehind. The weirs of the present invention, to provide for uniform watering of an area, are strategically located within both the main line and laterals whereby water will backup therebehind that then seeps through slots 19a into the surrounding soil. Shown in FIG. 1(a) and in FIG. 2 is a sleeve 20 whereto the tubular stock 18 of FIG. 1(a) is preferably secured, forming a section of lateral 12. The sleeve 20 of FIG. 1(a), shown in FIG. 2, has had a section removed therefrom to expose a weir 21 therein. The sleeve 20 preferably includes a collar 22 integral or secured thereto and is preferably formed of a plastic material. The collar has an inside diameter such as to accommodate and snugly fit over an end of tubular stock 18 fitted therein with the opposite sleeve 20 end to fit within a bell end of tubular stock 18, not shown. The collar 22 and tubular stock end are preferably secured together as with an epoxy or like adhesive. It is preferred that sleeve 20 is capable of being coupled to tubular stock 18, and, as needed to a lesser diameter of pipe, not shown, also, and therefore a stop 23 is preferably provided within the body of sleeve 20 for receiving and stopping a pipe end, or the like, thereagainst.

Shown best in the profile sectional view of FIG. 3, the weir 21 is preferably formed as a solid unit, can be molded separately or formed in the sleeve during the manufacturing thereof, and is preferably formed from a plastic or like material. Shown best in FIGS. 2 and 3, the weir 21 is preferably a plate that when viewed from a face thereof appears as a half circle; and has a triangular or wedge shape with a rounded base as viewed from the side, which weir has inclined opposite faces 21a and 21b, that join at their outer circumferences to the sleeve 20 interior surface, and meet along a common edge 21c that extends across the sleeve interior. So arranged, each of the faces 21a and 21b of weir 21 slope towards one another at more than a normal angle configuration to the sleeve interior surface wherefrom they extend and provide, thereby, for weir self cleaning in that a water flow thereover, will travel over the weir faces 21a and 21b to dislodge any materials clinging to the weir 21 or at the weir junction with the sleeve interior, and will pass such materials mixed with the flow over the weir apex 21c.

Figure 8:
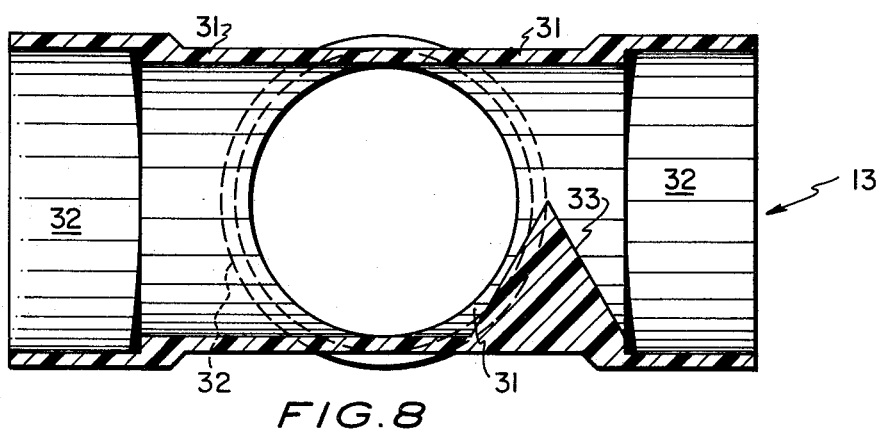

By a strategic placement of sleeves 20, including weirs 21 therein, in tubular stock 18 to form laterals 12 and including therewith, as appropriate, as shown in FIG. 8, weirs 33 in cross-pieces 13, as will be shown and described in detail later herein, a desired head or level of water can be backed up behind each weir, downstream from the supply line 14. The backed up water will seep, as described, through the slots 19a formed in the main line 11 and laterals 13 to provide a uniform watering of the soil area surrounding the present invention.

In laying out the irrigation and drainage apparatus of the present invention in appropriate trenches, not shown, in an area to be irrigated, it may be difficult to obtain a perfectly level installation or one having exactly a desired fall. Therefore, it is useful to provide, where appropriate, weirs of different heights, arranged as described in the sleeves 20 and cross-pieces 13, to compensate for elevation or grade differences in an actual installation from a programmed or design arrangement. Therefore, the weir 21 installed within the sleeve 20 or cross-piece 13, preferably within the scope of the present disclosure, can be fabricated to a desired height suitable to exactly balance the irrigation and drainage apparatus 10 of the present invention within an actual installation to meet design criterion. Of course, by providing weirs of different heights, as required for system balancing, it is necessary to include with or on a particular cross-piece or sleeve some arrangement for identifying the height of a weir therein. Such identification arrangement can involve color coding, numbering, or the like. Further, while weirs 21 and 33 are preferably formed, respectively in sleeve 20 and cross-piece 13, as shown, in the manufacturing or fabrication process thereof, it should be obvious that the weirs could be fabricated separately and later installed therein.

Figure 6:
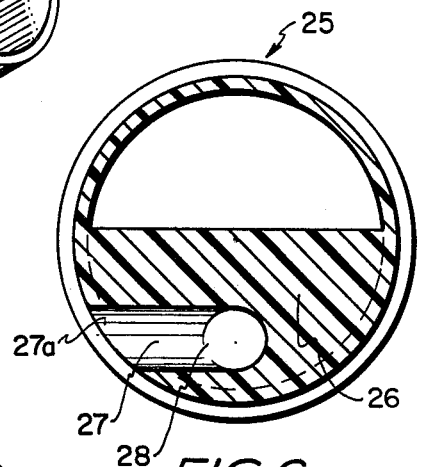

FIGS. 5 and 6 show a sleeve 25 that should be taken as being essentially like the described sleeve 20 except that it includes another embodiment or arrangement of a weir 26 therein. Weir 26, like the described weir 21, is preferably formed as an integral part of the sleeve 25 during fabrication or manufacture thereof, but could, of course, be formed separately for later installation therein. Weir 26, distinct from weir 21, preferably incorporates a passage 27 that is open, as shown best in FIG. 6, through a side of sleeve 25 at 27a. The passage 27 makes a normal angle bend within the weir at 28 and exhausts through an opening 29, in a weir sloping face 26a, as shown best in FIG. 5. In operation, a separate water-carrying line or pipe, not shown, is connected to the opening 27a to pass water therethrough to fill the area between weir 26 and another weir. So arranged, a desired head of water can be maintained between select weirs for compensating for system deficiencies, providing for a selective watering capability, or the like. Preferably, a knockout 30, or a like covering, is provided, as shown best in FIG. 5, for fitting into and closing the passage 27 at opening 27a. With the knockout 30 in place over opening 27a, the weir 26 will function as has been described with respect to weir 21. In the manufacturing process, knockout 30 can be formed over opening 28 and scored appropriately such that, with a minimum application of force thereto, it can be removed to open passage 27.

Figure 7:
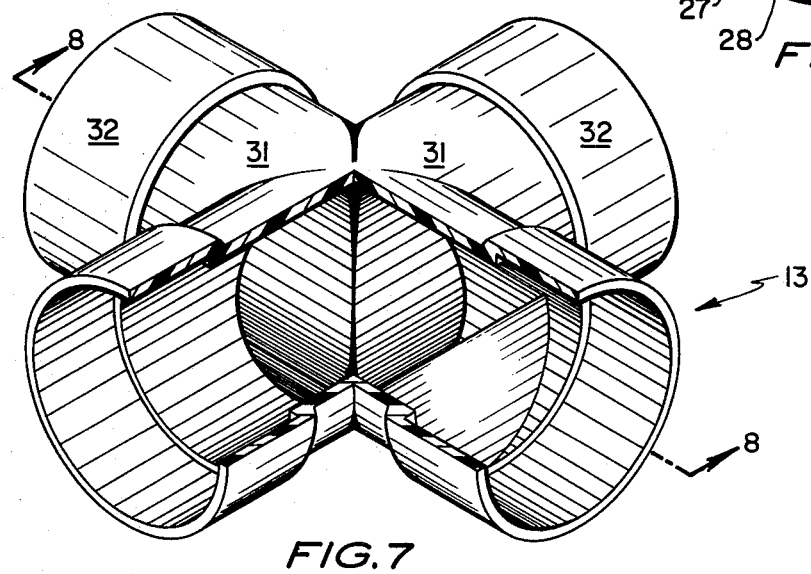

FIGS. 7 and 8 show a preferred arrangement of cross-piece 13 as including tube members 31 that intersect and are joined at normal angles to one another forming a cross. Each tube member incorporates to a bell end 32 arranged across an end thereof for receiving the end of a lateral 12 therein, as shown in FIG. 1.

Shown best in a sectional view of FIG. 8, cross-piece 13 preferably includes a weir 33, that is arranged in one tube member 31, preferably downstream from the junction of the other tube members 31 whereto laterals 12 are connected, for holding water therebehind, as described earlier herein with respect to weirs 21 and 26. While not shown, weir 33, like the described weir 26 could include a passage therein for adding a supplemental water or liquid supply as required.

In summary, unique to the present invention, the irrigation and drainage apparatus 10 incorporates a main line with laterals intersecting thereto and includes a strategic placement of the described weir arrangements whereby a head of water can be maintained over an entire area or field wherein the present invention is installed, water seeping out through slots, holes or like perforations, to uniformly supply water or a water and fertilizer mixture thereto. A proper positioning of weirs and taking into account and selecting appropriate heights thereof makes possible a system balancing whereby variations from a level or desired slope within the system can be compensated for. Further, the preferred sloping design of the weir faces provides for weir cleaning when a water flow is passed thereof. Also, while not shown, it should be understood that a return line could be provided with appropriate pumps, or the like, for moving the water, with or without fertilizer mixed therein, back to main line 14 for recycling through the present invention.

The present invention, by incorporating an arrangement for passing an air-flow into both the supply and main flow lines that passes out through appropriate perforations or holes in the laterals, provides for an aeration of the area being watered, which air-flow can also incorporate or include an airborn fertilizer therein. Further, a recycling capability, not shown, could be provided to an air and fertilizer mixture remaining in the system for another passage through the apparatus within the scope of this disclosure.

While a preferred arrangement of an irrigation and drainage apparatus 10 of the present invention has been shown and described herein, as consisting of main line, laterals, cross-pieces, and sleeves, that are preferably constructed of a plastic material, it should be obvious that the present disclosure is made by way of example and for illustration only and that other forms, arrangements, or structures fabricated of like or different materials, to the plastic called for herein, could be employed without the departing from subject matter coming from the scope of this disclosure. Therefore, the present invention should be taken as being made by way of example only and variations are possible without the departing from the subject matter coming within the scope of the following claims, which claims we regard as our invention.

We claim:

1. An irrigation and drainage apparatus comprising,
   a main line arranged for subsurface installation in an area to be irrigated to pass water therethrough;
   a source of water connected to pass water into said main line;
   a lateral line for subsurface installation connected to receive water from said main line;
   weir means secured in said lateral line for partially blocking a flow of water therethrough consisting of, 'a half circular wedge shaped plate that is secured across said lateral so as to block a lower portion thereof, said plate having a profile triangular shape with upstanding sides thereof sloping towards one another from ends of a base thereof that meet in a common apex that extends across said lateral line as the weir means crest, which wedge shaped plate contains an internal passage formed therein that is arranged to be capable of being opened through an outer wall of said lateral line to receive, when appropriately connected, a liquid flow therethrough and exhausts such flow through an opening formed in an upstanding side thereof downstream to the water flow from said main line; and
   means formed in said lateral line below a level of a flow of water therein for passing water therethrough into a surrounding area.

2. An irrigation and drainage apparatus as recited in claim 1, wherein the main line includes, weir means, like that secured in said lateral line, arranged therein for partially blocking a flow of water therethrough; and
   means formed in said main line below a level of a flow of water therein for passing water therethrough into a surrounding area.

3. An irrigation and drainage apparatus as recited in claim 1, further including,
   a cross-piece for coupling the lateral line to the main line, wherein a weir means like that secured in said lateral line is secured across said cross-piece so as to block a lower portion thereof downstream from a connection to said lateral line.

4. An irrigation and drainage apparatus as recited in claim 1, further including,
   means for passing an air-flow into the main and lateral lines; and
   hole means formed in said lateral line above a level of a flow of water therein.

5. An irrigation and drainage apparatus as recited in claim 4, wherein,
   the main line includes hole means formed therein above a level of a flow of water therein.

6. An irrigation and drainage apparatus as recited in claim 1, further including,
   a sleeve for arrangement with the lateral line and includes a weir means therein like that secured in said lateral line that is connected across said sleeve so as to block a lower portion thereof.

7. An irrigation and drainage apparatus consisting of, a weir means for installation in a water transporting line of an irrigation and drainage apparatus consisting of a half circular wedge shaped plate that is secured to extend across said water transporting line so as to block a lower portion thereof to a main water flow, said plate having a profile triangular shape with upstanding sides thereof sloping towards one another from ends of a base thereof that meet in a common apex that extends across said water transporting line as the weir means crest and contains an internal passage formed therein that is arranged to be capable of being opened through an outer wall of said water transporting line to receive, when appropriately connected, a liquid flow therethrough and exhausts such flow through an opening formed in an upstanding side thereof downstream to the main water flow.

8. An irrigation and drainage apparatus as recited in claim 7 further including,
knockout means arranged in said water transporting line outer wall over said passage for opening said passage.

9. An irrigation and drainage apparatus as recited in claim 7, wherein,
the weir means is secured in a sleeve arranged for installation into a lateral line.

10. An irrigation and drainage apparatus as recited in claim 7, wherein,
the weir means is secured in a cross-piece.

11. A method for providing a uniform subsurface water distribution to an area to be irrigated utilizing a subsurface irrigation and drainage apparatus that includes at least one each main and lateral lines connected to receive and pass a main water flow therethrough that each have holes formed appropriately therein to exhaust a portion of that water flow into a surrounding area, prior to burial of that apparatus comprising the steps of,
installing weirs therein of a height selected to both partially block a free water flow therethrough, and to retain a volume of water backed up appropriately therebehind that is sufficient, taking into account variations from a desired system grade, to provide uniform system watering through the holes formed in the main and lateral lines; and
connecting an external water source through a weir to provide a water flow between weirs, augmenting the main water flow.

12. A method as recited in claim 11 further including, mixing a fertilizer with the water flow into the irrigation and drainage apparatus.

13. A method as recited in claim 11, further including passing an air-flow into the irrigation and drainage apparatus for passage therefrom into the area wherein the irrigation and drainage apparatus is installed.

14. A method as recited in claim 13, further including, mixing an airborn fertilizer into the air-flow.

* * * * *